(12) United States Patent
Brandes

(10) Patent No.: US 8,787,894 B2
(45) Date of Patent: Jul. 22, 2014

(54) HANDLING OF APPLICATIONS OF MOBILE TERMINALS IN A SERVING NODE

(75) Inventor: Henning Brandes, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 139 days.

(21) Appl. No.: 13/182,874

(22) Filed: Jul. 14, 2011

(65) Prior Publication Data

US 2012/0015640 A1    Jan. 19, 2012

Related U.S. Application Data

(60) Provisional application No. 61/364,256, filed on Jul. 14, 2010.

(30) Foreign Application Priority Data

Jul. 14, 2010   (EP) .................................. 10169495

(51) Int. Cl.
*H04M 3/00*        (2006.01)

(52) U.S. Cl.
USPC ........................ 455/418; 455/410; 455/411

(58) Field of Classification Search
USPC ..................... 455/410, 411, 415, 418–420
See application file for complete search history.

(56) References Cited

U.S. PATENT DOCUMENTS

| 2007/0058549 A1* | 3/2007 | Speks et al. ................... 370/236 |
| 2008/0304438 A1* | 12/2008 | Stille ............................. 370/328 |
| 2009/0215438 A1* | 8/2009 | Mittal et al. ................... 455/418 |
| 2011/0135077 A1* | 6/2011 | Wengrovitz ............ 379/202.01 |

FOREIGN PATENT DOCUMENTS

WO    WO 00/25535 A1    5/2000

OTHER PUBLICATIONS

Bhat R R et al. JAIN Protocol APIs. IEEE Communications Magazine. vol. 38. No. 1. Jan. 2000.

Gbaguidi C et al: Integration of Internet and Telecommunications: An Architecture for Hybrid Services. IEEE Journal on Selected Areas in Communications. vol. 17. No. 9. Sep. 1999.

* cited by examiner

*Primary Examiner* — Wayne Cai

(57) ABSTRACT

A method of supporting a communication between a mobile terminal UE and a serving node of a telecommunication network, the serving node comprising an application interface, a programming module and a basic code module storing and processing basic functions. The serving node receives an initialization message from the UE and determines a call reference number for the incoming call. An incoming call listener is activated to listen to incoming calls that are related to the call reference number. A signal is created which listens for a trigger-signal in basic functions in the basic code module. After the incoming call, related to the call reference number is detected, the signal listener is allocated to the incoming call, wherein an application in the programming module is executed after the signal listener detects the trigger signal related to the call reference number.

22 Claims, 6 Drawing Sheets

HANDLING OF APPLICATIONS OF MOBILE TERMINALS IN A SERVING NODE

This application claims the benefit of EP patent application number 101694958 filed on Jul. 14, 2010, and U.S. provisional application No. 61/364256 filed on Jul. 14, 2010, the disclosure of which is fully incorporated herein by reference.

TECHNICAL FIELD

The invention relates to a method of supporting a communication established between a mobile terminal and a serving node of a telecommunication network.

BACKGROUND

Programmable mobile terminals or mobile phones are becoming a huge business case in the future for operators and providers. These mobile terminals are based on special operating systems for mobile terminals like Windows or Linux and comprising a programming area for storing applications. One of the most popular operating systems for programming mobile terminals is the Android operating system which is based on a modified Linux kernel. This operating system allows developers to write so-called managed code in the Java language. With the exception of brief update periods, the operating system Android has been available as open source since October 2008. From this time, a lot of applications have been developed to make the mobile terminals more user-friendly and to enable numerous usages.

To implement the applications of mobile terminals in a telecommunication network, some implementations of applications in packet switched (PS) networks are established. The mobile terminals can e.g. be connected via a gateway GPRS (General Package Radio Service) server to an internet server which provides several applications for mobile terminals. The IP multimedia subsystem (IMS) is another example for delivering Internet Protocol (IP) multimedia services in a PS network with respect to a mobile terminal. The user can connect his IMS terminal, which can be a mobile phone or a mobile computer, to the IMS network using IP. In the IMS, a server can provide applications for the IMS terminal.

To use applications stored in a mobile terminal in a circuit switched (CS) environment without using the implementation of a PS network, the mobile switching center (MSC), which controls the connection between the CS network and a mobile terminal, has to be modified. To implement new features into an existing MSC by changing the basic code is very difficult due to the need of changes in the Global System for Mobile communications (GSM) standards. Even if a change is possible, new MSC features have a long time-to-market gap.

SUMMARY

It is an object of the present invention to enhance the flexibility of a provision of services between a serving node in a telecommunication network and a mobile terminal. This object is achieved by the independent claims. Advantageous embodiments are described in the dependent claims.

According to the present invention, this object is achieved by a method of supporting a communication established between a mobile terminal, UE, and a serving node of a telecommunication network, wherein the serving node comprising an application interface for receiving and sending messages to the UE, a programming module adapted to store and process applications and a basic code module adapted to store and process basic functions of the serving node. The basic functions of the serving node in circuit switched network are the routing of voice calls and other services. The serving node sets up and releases the end-to-end connection, handles hand-over requirements during a call and takes care of charging and real time pre-paid account monitoring. These functions are performed by the basic functions in the basic code module. According to the present invention the serving node receives an initialization message from the UE at the application interface and determining a call reference number for the succeeding incoming call. The call reference number can be an international mobile subscriber identity, IMSI. A further step is the activation of an incoming call listener to listen at incoming calls, related to the call reference number. The incoming call listener is a software program which checks the incoming call reference numbers at the interface of the serving node, which handles the incoming calls. The software can be stored inside the programming module of the serving node. The next step is the creation of a signal listener, which listens at a trigger-signal in the basic functions. The signal listener is a software code in the serving node which is adapted to check the basic code in the basic code module of the serving node. After the incoming call listener detects an incoming call related to the call reference number, the signal listener is allocated to the incoming call. In the basic functions of the serving node, every call is handled in the basic code module. It is therefore important that the signal listener only listens at the call related methods and codes in the basic code module. After the signal listener detects a trigger-signal in the basic functions related to the call reference number; an application is executed in the programming module. To implement new functions and services in a serving node, there is no need to change the basic functions in the serving node. New applications in a programming module can interact with the basic code of the serving node by signal listeners which triggers the execution of additional software code in the programming module.

After the application interface receives an initialization message from the UE, an application, triggered by the application interface, is executed in a further embodiment. This application is adapted to create a signal listener and to trigger basic functions in the basic code module. This application controls the setup of additional functions in the serving node and can be modified without changing the code in the basic functions. If a new service should be adopted in the serving node, a new application has to be inserted in the programming module by an operator. This new application is triggered by the application interface which receives the initialization messages from the UE. To implement a new service, a new identifier has to be inserted in the initialization message to trigger the new application in the programming module.

In a further embodiment of the invention the method further performs the step of starting a call timer associated with the call reference number, after the activation of the incoming call listener. When the call timer expires before the incoming call listener detects an incoming call related to the specified call reference number, the incoming call listener which is: related to the specified call reference number will be deactivated. The deactivation of the incoming call listener can be performed by the application interface or an additional software program, stored in the programming module. The implementation of a call timer has the advantage that if a succeeding call cannot be established in the serving node, the incoming call listener can be deactivated. Storage and processing capacity can be reallocated to other functions or other incoming call listeners.

In a further embodiment the application interface sends or receives data to or from the UE initiated by the application running in the programming module or in the UE. It is possible to display information on a screen of the UE to inform the Operator of the UE about ongoing processes in the serving node. An example is the setup of a multi party call, wherein the serving node sends information related to connected members of the multi party call via the application interface to the UE to inform the operator of the UE, who is already connected to his multi party call.

In a further embodiment of the invention, the basic function in the serving node related to the specified call reference number is blocked during the operation of the application in the programming module after a trigger-signal in the basic functions related to the specified call reference number is detected by the signal listener. It is therefore, possible to test or check a new software code which performs a basic function of a serving node without replacing the basic code in the serving node.

In a further embodiment of the invention the basic function in the serving node related to the specified call reference number proceeds after a trigger-signal in the basic functions related to the specified call reference number is detected by the signal listener. Therefore it is possible to execute several applications and functions in parallel to save time.

In a further embodiment of the invention, the initialization message comprises a delay indication for the serving node to delay the deactivation of an incoming call listener. This has the advantage that if additional applications or software code in the UE can be executed before the UE establishes the call. It is e.g. possible to check data from an external server before setting up the call.

In a further embodiment, a signal adapter translates data which is send between the application of the programming module and the basic function of the basic code module. Therefore it is possible to influence the execution of basic functions of the serving node by the application of the programming module and vice versa. The application in the programming module can e.g. initiates a new call in the serving node for setting up a conference call.

In a further embodiment, every incoming call from another serving node is checked by a B-number listener in the terminating serving node which triggers an application inside the programming module if for a receiving call this function is set by a subscriber at the terminating serving node. The terminating serving node is also able to established further services. The trigger of the execution of additional functions in the terminating serving node is performed by the incoming call.

In a further embodiment a negotiation between the UE and the serving node is performed to check the ability of the serving node to handle the application of the UE before an initialization message is received by the serving node. In an environment which includes serving nodes from different manufacturers or serving nodes with different software or hardware versions, it is advantageously to check the performance of a specified serving node before trying to use any services. It could also happens that the network or the capability of the serving node is not adequate to perform additional services or functions.

In a further embodiment the negotiation comprises the steps of sending a request to the serving node by the UE, wherein the request comprises a service-identity, checking if an according application is implemented in the programming module of the serving node, and sending a result to the UE by the serving node which indicates the availability of the application in the serving node. The service identity can be any kind of identifier which identifies the kind of service which should be performed by the serving node (e.g. conference call).

The invention is also about a serving node, comprising a basic code module, adapted to store and process the basic functions of the serving node, an application interface adapted to receive an initialization message from a mobile terminal, UE, and determining a call reference number from the initialization message. The application interface is further adapted to initiate activation of a call listener. The application interface can also be a server which is not part of the hardware of the serving node. The call listener is adapted to listen at incoming calls related to the specified call reference number, after the application interface received the initialization message from the UE. Further the application interface is adapted to initiate creation of a signal listener, adapted to listen at a trigger-signal related to the specified call reference number in the basic functions of the serving node. The serving node further comprises a programming module, adapted to store and execute an application after the signal listener detects a trigger-signal in the basic functions related to the specified call reference number.

Further embodiments of an inventive serving node relate to a serving node performing one of the already mentioned methods and steps.

The present invention also concerns computer programs comprising portions of software codes in order to implement the method as described above when operated by a respective processing unit of a user device and a recipient device. The computer program can be stored on a computer-readable Medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
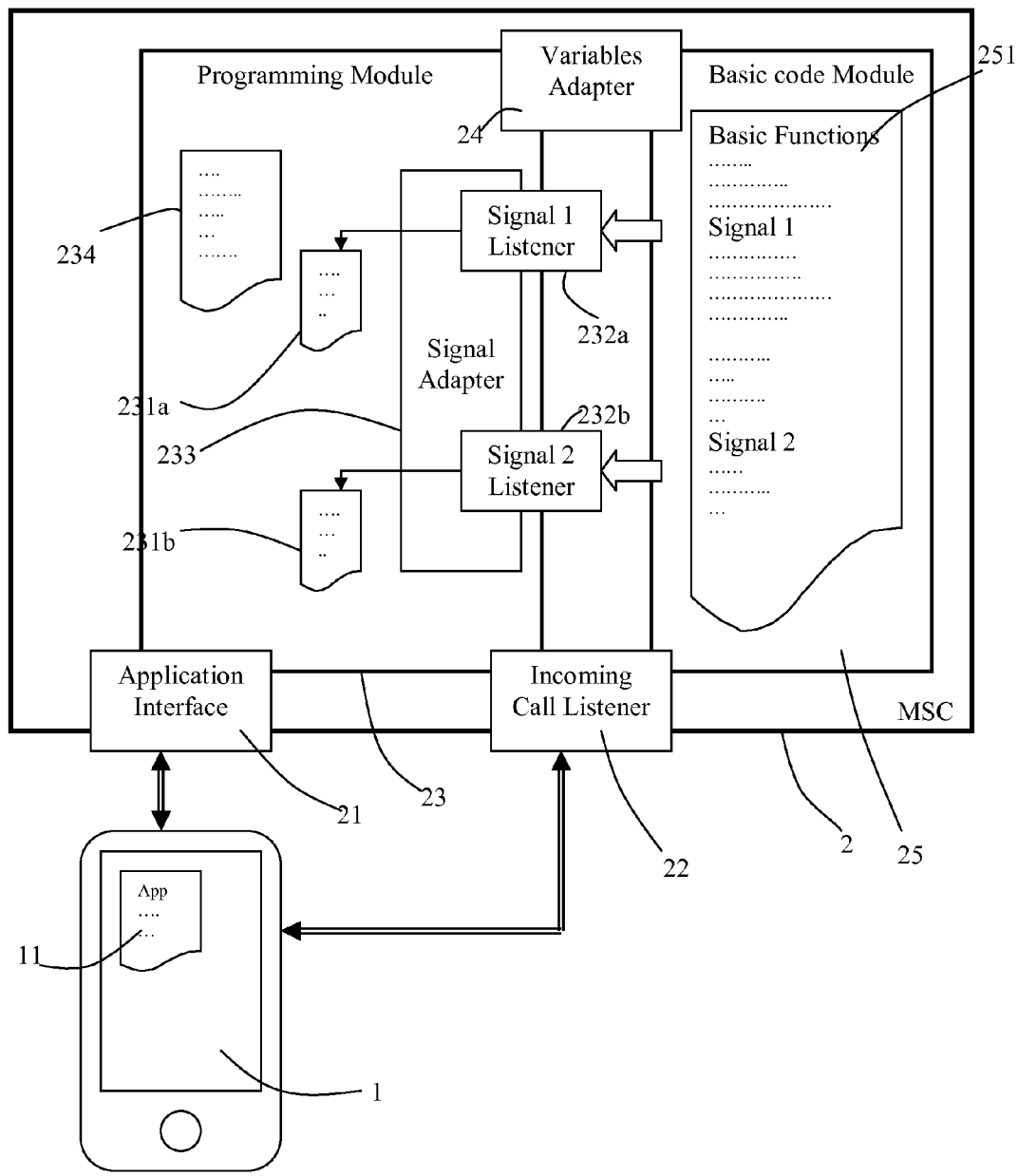
FIG. 1 shows a block diagram of an embodiment of a serving node and a mobile terminal.

FIG. 1 shows a serving node 2 of a telecommunication network which constitutes the interface between a radio system and the fixed networks. This serving node 2 can be designated as a mobile switching center, MSC, server in a circuit switched, CS, network. The MSC server 2 performs all necessary functions in order to handle the CS services to and from a mobile terminal (UE) 1. This UE 1 is capable to store and execute programs and can be a mobile terminal or mobile phone. The UE 1 can also be a programming mobile terminal or phone such that an operator can write his own software program or download a software program from the internet. The MSC server 2 is an exchange, which performs all the switching and signaling functions for the UE 1, located in a geographical area designated as the MSC area and terminates the user-network signaling and translates it into the relevant network.

The UE 1 is connected via a non shown radio access network to the MSC server 2 to perform the necessary data exchange in a communication session.

The MSC server 2 comprises an application interface 21, which is adapted to exchange data with an application 11 stored in the UE 1. The application interface 21 can be an external or integrated server which is connected to the MSC server 2 and comprises a processing unit, several interfaces and a program store for storing software code. The application interface 21 can e.g. designed in using Unstructured Supplementary Service Data (USSD). This data-service is generally associated with real-time or instant messaging type phone services and features the advantage that the response times for interactive USSD-based services are generally quicker than those used e.g. for Short Message Service (SMS). This is because the USSD commands are transferred to the MSC using the fast associated control channel (FACCH). The later incoming call has to be associated to the USSD commands. The data exchange between the UE 1 and the application interface 21 is performed over a radio access network which is not shown in all the figures.

The MSC server 2 further comprises an incoming call listener 22 which listens to specified identification element or call reference numbers in a call. An example for a specified call reference number is the international mobile subscriber identity (IMSI) Which is a unique number associated with all GSM and UMTS network UEs 1. Also other identification methods are possible. It is stored inside the UE 1 and is sent by the UE 1 to the network. The data exchange, between the UE 1 and the incoming call listener 22 is performed over a radio access network. The incoming call listener 22 can be an interface allocated with a software which is checking the One element in the MSC server 2 is the basic code module 25 which is adapted to store and proceed the basic MSC switching and signaling functions 251 in order to handle the circuit switched (CS) services for the UE 1. Further the basic module 25 is enhanced to handle the setup of signal listeners 232a, 232b. To provide a fast program flow in the MSC server 2, the basic functions 251 of the MSC server 2 can be programmed in an event-driven, real-time programming language, wherein the code execution is triggered by special events, encoded as signals or methods. One example of such programming language is PLEX (programming language for exchanges) comprising a number of methods 252a, 252b, 252c, shown in FIG. 2a-c. Each method 252a, 252b, 252c needs a specific method call to be executed. It is therefore possible to stop a process in the MSC server 2 by suppressing a method call. Because the MSC server 2 is capable to handle a lot of calls from different UEs 1, each method has to be allocated to a specified call. The call reference number has to be allocated to the specified methods 252a, 252b, 252c.

The MSC server 2 further comprises a programming module 23. This module can be programmed in any programming language, e.g. JAVA or C++ and contains applications 231a, 231b, 234 which are stored inside this module. The programming module 23 is adapted to run the stored applications 231a, 231b, 234. The start of an application 231a, 231b is triggered by a signal listener 232a, 232b. The start of the application 234 can be triggered by the application interface 21 or any other applications 231a, 231b. The signal listener 232a, 232b listens to special signals or method calls included in the basic function 251 of the MSC server 2. After the signal listener 232a, 232b detects a specified signal or method call or the specified data content of a signal or method call in the basic function 251 of the MSC server 2, it triggers the execution of an application 231a, 231b. FIG. 1 shows two signal listeners 231a, 231b, wherein the first signal listener 232a, which listens to a first signal or method call or a special content in a first signal or method call in the basic function 251, triggers the execution of a first application 231a in the programming module 23. The second signal listener 232b listens to a second signal or method call or a special content in a second signal or method call in the basic function 251 and triggers the execution of a second application 231b in the programming module 23 when it detects the before mentioned second signal or method call or its special content.

To differentiate between calls from different UEs 1, the car reference number of a specific call has to allocated to the signal listeners 232a, 232b and the basic function 251 for this call. This allocation is performed by the incoming call listener 22. A signal listener 232a, 232b, which is allocated to a specific call reference number can only listen to the basic function 251, which is allocated to the before mentioned specific call reference number.

The programming module 23 is further adapted to determine the content of variables related to the specific call reference number from an adapter 24 which is connected to the basic code module 25 and to the related basic function 251 which is allocated to the specific call reference number.

A signal adapter 233 is arranged between the programming module 23 and the basic code module 25 to translate signals or data coming from the basic code module 25 or signals and data coming from the programming module 23.

Figure 2A:
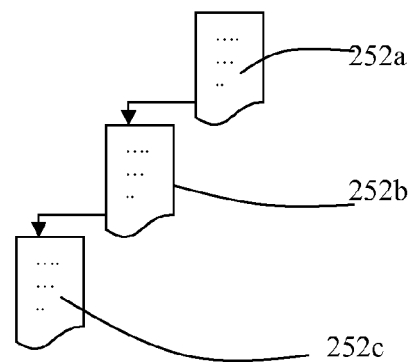
FIG. 2a shows a sequence diagram of method calls.

FIG. 2a depicts a standard situation in the basic code module 25, wherein each method 252a, 252b, 252c is called by a signal or method call. In this embodiment, method 252a is calling method 252b and method 252c is called by method 252b. It is also possible that an external call triggers a method 252a, 252b, 252c.

Figure 2B:
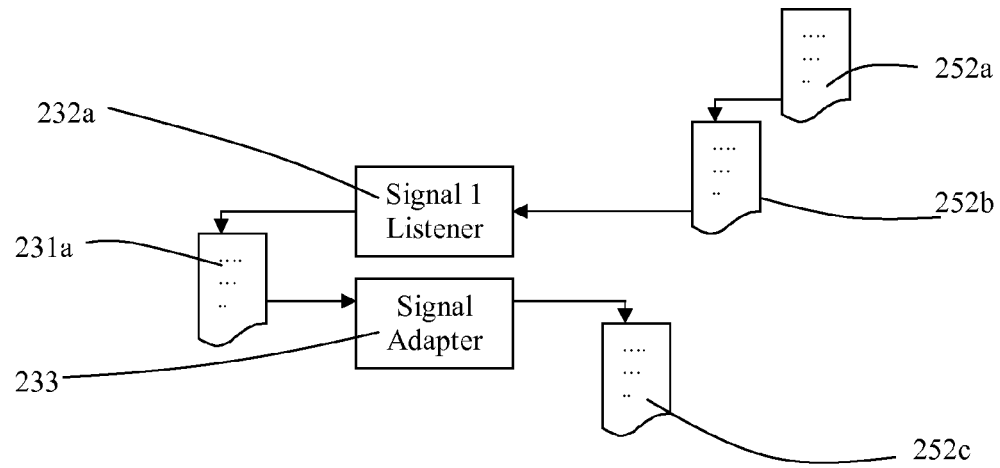
FIG. 2b shows a sequence diagram of method calls, wherein a signal listener interrupts the method call.

FIG. 2b depicts an embodiment of the present invention, wherein a signal listener 232a listens at a method call or signal from the method 252b. The method call for method 252c is blocked. The signal listener 232a triggers the execution of an application 231a in the programming module 23 which is adapted to send a signal to the basic function 251, translated by a signal adapter 233, to call the next method 252c. In this embodiment, the application 231a in the programming module 23 replaces a (not shown) method in the basic function 251. It is therefore possible to patch the MSC without replacing or changing the basic function 251.

Figure 2C:
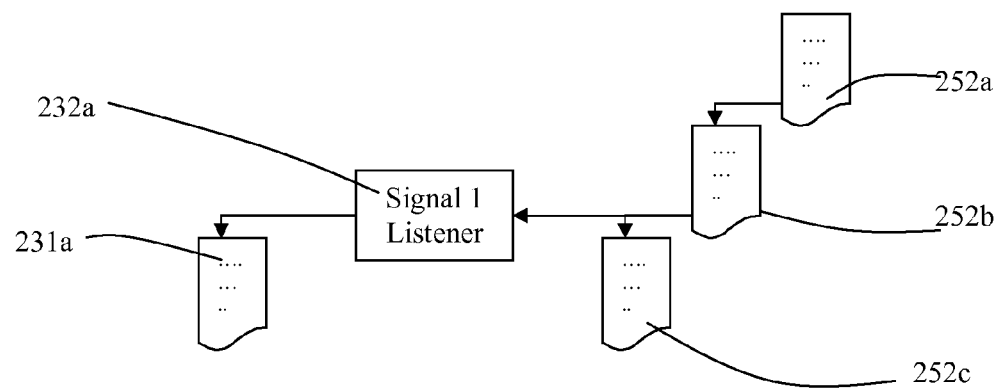
FIG. 2c shows a sequence diagram of method calls, wherein a signal listener initiates a parallel method.

FIG. 2c depicts an embodiment of the present invention, wherein the signal listener 232a also listens at a method call or signal from the method 252b. The method call for the next method 252c is not blocked and therefore the application 231a is executed independently to the method 252c. The application 231a is e.g. adapted to display data on the UE 1 or setup further signal listeners 232a, 232b.

Just in time information, e.g. social data or time related data from a calendar can be concerned when setting up the signal listeners 232a, 232b or performing code in the applications 231a; 231b. Even a question/answer interface with the UE 1 can be started.

Figure 3A:
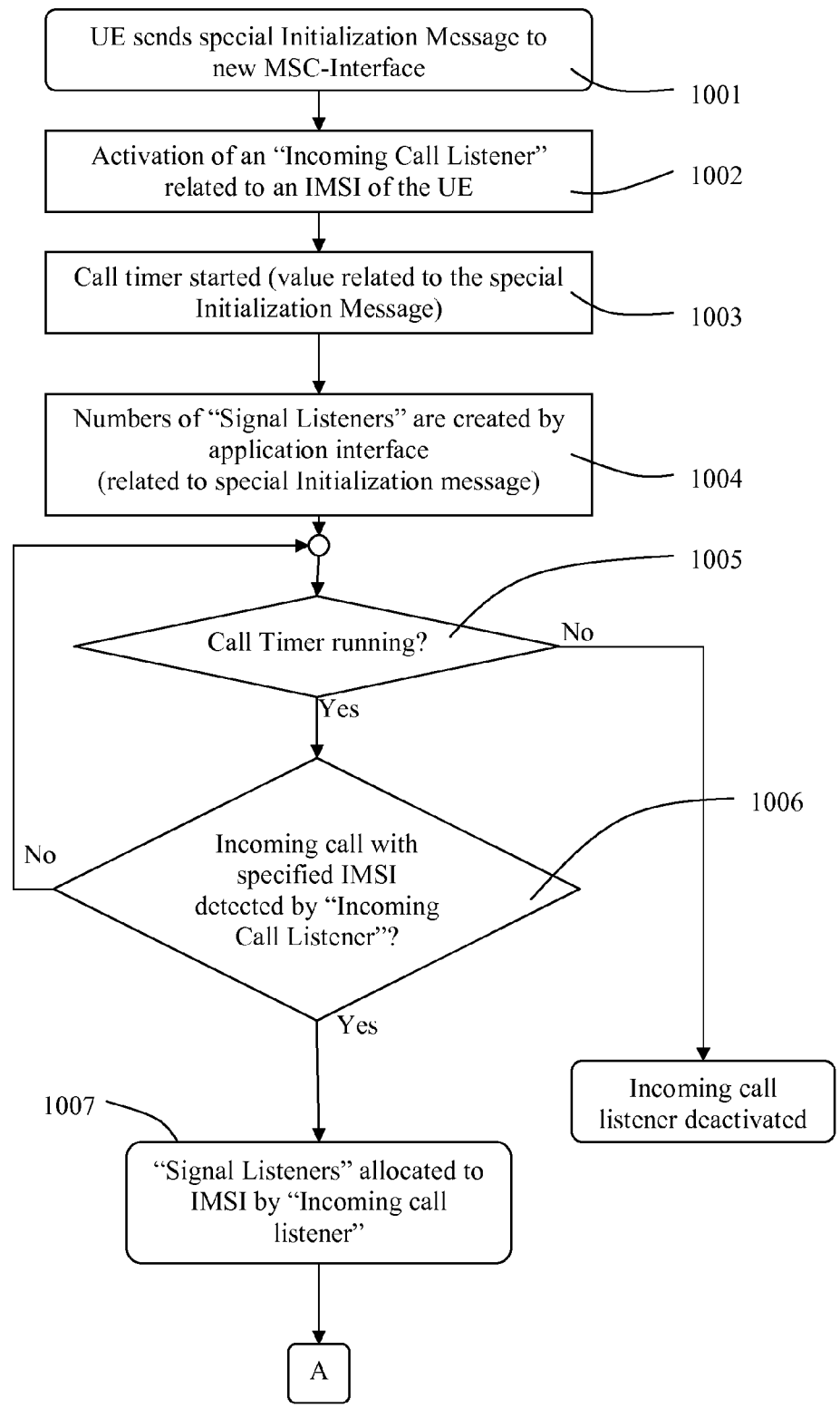
FIG. 3a, 3b show a sequence diagram of a communication established between a mobile terminal and a serving node.
Figure 3B:
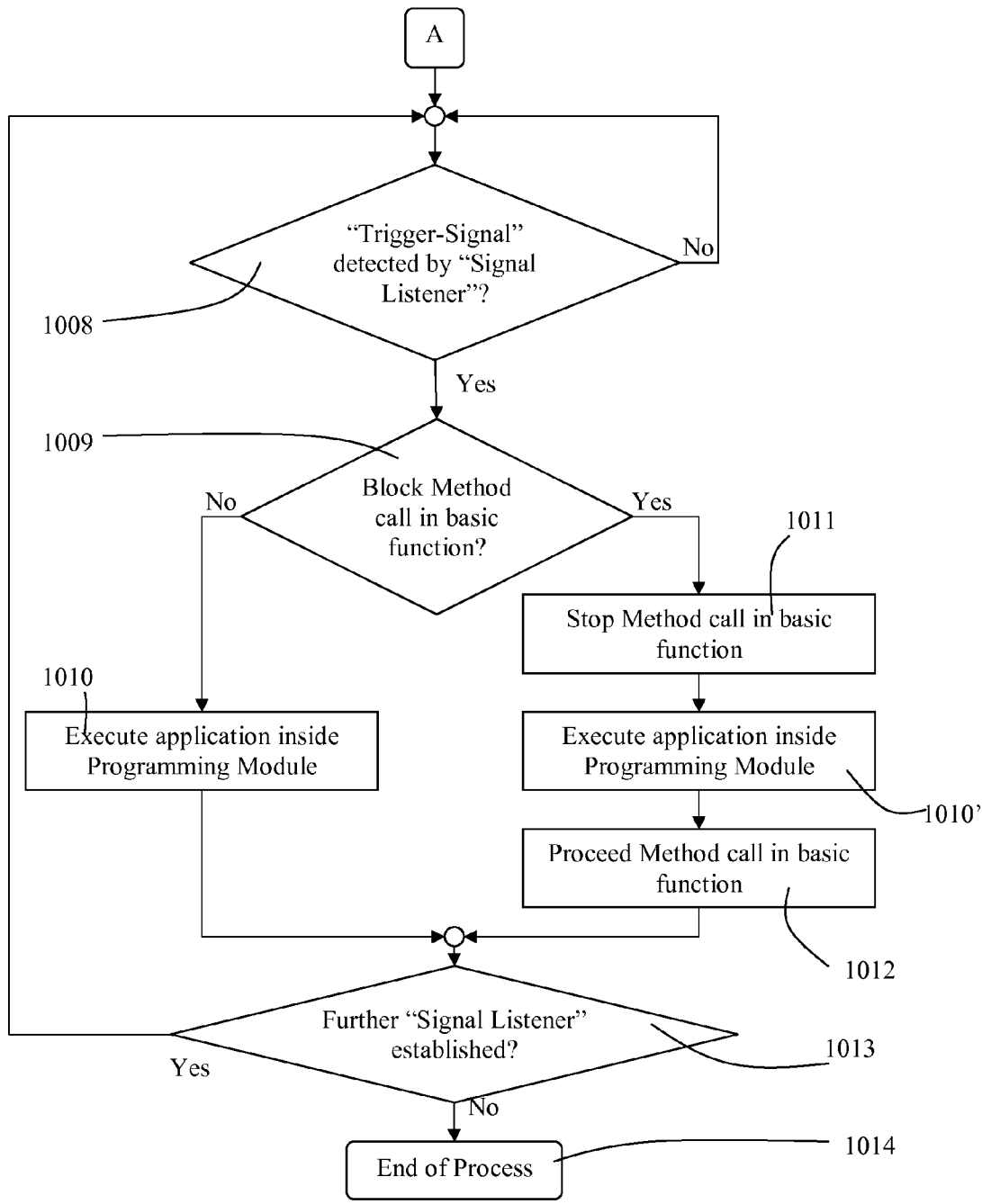

FIGS. 3a and 3b show a sequence diagram of a communication established between a UE 1, and a MSC server 2. In the first step 1001, a UE 1 sends a special initialization message to the application interface 21 of the MSC server 2. This special initialization message comprises at least a call reference number to identify the later incoming call, related to the UE 1 which initiated this first step 1001. This call reference number can be e.g. an IMSI. All further steps are related e.g. to this specific call reference number to restrict this call handling from other calls, which can also be handled by the MSC server 2. The initialization message can include several additional data which are necessary to execute applications 231a, 231b, 234 in the programming module 23 or to create call listeners 232a, 232b. An example for additional data can be call numbers to which the operator of the UE 1 wants to establish a multi party call. Another example of data in the initialization message is a delay indication to enhance the time on which the incoming call has to be detected by the incoming call listener 22. This enhancement may be necessary if the application 234 needs some more time to establish signal listeners 232a, 232b or to establish contact to external databases.

In step 1002, an incoming call listener 22 is activated in the MSC server 2. This incoming call listener 22 is related to the before mentioned determined IMSI or call reference number to identify the later incoming call. A call timer can be started in step 1003. The duration of this call timer can be specified in the initialization message and depends on the kind of application 11 which has to be executed in the UE 1. When the UE 1 has to process further steps during the initialization of the call (e.g. consulting an address book), the duration of the call timer will be increased.

In step 1004, signal listeners 232a, 232b, are created. The number and parameters of the signal listeners 232a, 232b can be determined from the initialization message e.g. by an application 234 which is also stored in the programming module 23. In the example of FIG. 1, two signal listeners 232a, 232b are created, listening at a "signal 1" and a "signal 2" in the basic function 251. It is possible that the signal listeners 232a, 232b may also be triggered not only by the signal itself but by the content of a signal in the basic function 251. Every signal listener 232a, 232b is associated with an application 231a, 231b in the programming module 23. If a signal listener 232a, 232b is triggered, it starts the associated application 231a, 231b in the programming module 23.

In step 1005 and 1006, the call timer is checked by the incoming call listener 22. If the call timer is not expired, and an incoming call with the specified call reference number is detected, the call is established and the signal listeners 232a, 232b remains active. If the call timer has expired, the incoming call listener 22 is deactivated. All other established signal listeners 232a, 232b will be deactivated. If an incoming call is detected thereafter, the call is handled as a normal call without involving the applications 231a, 231b, 234 in the programming module 23.

After an incoming call is detected by the incoming call listener 22, the incoming call listener 22 allocates the established signal listeners 232a, 232b to the call program code 251 with the detected call reference number, e.g. the IMSI. The signal listeners 232a, 232b only listen on signals or method calls which are related to the incoming call. Signals and method calls relating to other calls which are also handled by the MSC server 2, will not be touched.

In step 1008 (FIG. 3b), the signal listeners 232a, 232b check the basic functions 251 for specified signals or contents in these signals. If a signal listener 232a, 232b detects a signal or the specified content of a signal, the associated application 231a, 231b is executed in step 1010, 1010". The signal can also be used as a method call for a method 252a, 252b, 252c in the basic function 251.

In an embodiment of the invention, a further step 1009 is included which determines the need to block the execution of the basic function 251 during the execution of the associated application 231a, 231b. An example to block the further execution of the basic function 251 is to block the method call for the next method 252a, 252b, 252c in the basic function 251. This decision can be based on an information element which can be determined by an application 234 in the programming module 23 with data from the initialization message which was sent in step 1001 to the application interface 21. The decision is based on the kind of signal listener 232a, 232b. The application 231a, 231b is adapted to trigger methods 252a, 252b, 252c in the basic function 251 with the same call reference number or with a different call reference number via the signal adapter 233. It is also possible that the application 231a, 231b creates new signal listeners 232a, 232b which then triggers the execution of further applications 231a, 231b.

Step 1011 is executed which blocks the method call in the basic function 251. After the application 231a, 231b inside the programming module 23 is executed in step 1010', the method call in the basic function 251 proceeds (step 1012). The continuation of the method call can be triggered by the application 231a, 231b via the signal adapter 233.

It is also possible to establish a parallel process which can be executed in parallel to the basic function 251. Therefore, no blocking of the method call 252a, 252b, 252c in the basic function 251 is performed. The application 231a, 231b is executed in step 1010. The parallel executed application 231a, 231b can trigger a method 252a, 252b, 252c in the basic function 251 with a call reference number which is different from the call reference number of the call which was identified by the incoming call listener 22 before. It is not possible to have methods 252a, 252b, 252c executed in the basic function 251 in parallel to other methods 252a, 252b, 252c with identical call reference numbers. The application 231a, 231b can also trigger new applications in the UE 1 or send data to it. It is also possible that the application 231a, 231b creates new signal listeners 232a, 232b which then triggers the execution of further applications 231a, 231b.

A further application 234 is introduced which is not triggered by a signal listener 232a, 232b. This application 234 can be triggered by the application interface 21 after a first contact to the UE 1 is established and is also adapted to create signal listeners 232a, 232b.

During the processing of the application 231a, 231b, 234 data can be exchanged between the application 231a, 231b, 234 in the programming module 23 and the application 11 located on the UE 1. This data exchange is performed by the application interface 21. The application 231a, 231b, 234 can therefore triggers additional action, e.g. asking for additional input via the user interface in the mobile terminal UE 1. The UE 1 can be any kind of mobile terminal which is adapted to process applications 11. The operating system of such a mobile terminal 1 can be e.g. an Android-system, LINUX-System or a Windows Mobile-System. Also other operating systems for mobile terminals are possible.

It is also possible to exchange data between the applications 231a, 231b, 234 and the basic function 251 located in the basic code module 25 via the variables adapter 24. To translate signals from one programming language to another programming language, a signal adapter 233 is introduced which is located between the programming module 23 and the basic code module 25. During the process of data exchange, no changes in the basic function 251 were realized. This is important because a change in the basic function 251, particularly if external signal interfaces are touched, is mostly not possible without a change in the standards.

A signal listener 232a, 232b can also be activated or set by the application 231a, 231b to listen at signals in the basic function 251.

After all activated signal listeners 232a, 232b have triggered an associated application 231a, 231b (step 1013), the special handling of this call ends in step 1014. It is possible that the call is ongoing and is therefore handled in the basic code module 25 according to standard procedures. It is advantageous to release all listeners 232a, 232b, 22 to be able to reallocate memory capacity and processing capacity to new calls.

One example to use the inventive method is the setup of a multi party call without any time delay. In a standard environment, a multi party call means serial setup of single discrete segment of a call (call legs) in the mobile terminal 1. This results in a time delay for the initiator and also for the members of the multi party call. According to an embodiment of the invention, a user of a mobile terminal 1 starts a multi party call application 11 on the UE 1. The application 11 triggers the UE 1 to send an initialization message via the application interface 21 to the MSC server 2. The call reference number or IMSI of the UE 1 is determined and a call listener 22 is activated. In parallel a call timer is started. The initialization message comprises the numbers of the participants of the multi party-call except the one who is called later directly. Due to this numbers, several signal listeners 232a, 232b are created wherein the number of signal listeners 232a, 232b depends on the number of participants in the multi party call. The signal listeners 232a, 232b try to detect the completion of connection of a call leg. Additionally the same number of signals is sending out via the signal adapter 233 to trigger the setup of the call legs. Every call leg has its own call reference number. The UE 1 initiates a basic call to one of the participants (e.g. the first participant on the list of the party). This basic call has to be initiated before the call timer expires. Every call leg is linked to a signal listener 232a, 232b which listens to the "connection-complete-signal" for each call. When a connection is established, the signal listener 232a, 232b triggers an application 231a, 231b which is able to send information to the UE 1. Further the application 231a, 231b creates a signal which is translated by the signal adapter 233 and is sent to the basic function 251 to set the connection on "hold". A further signal listener 232a, 232b is created by the application to listen on a "hold complete" signal from the basic function 251. After the "hold complete" signal is detected, a signal, which is translated by the signal adapter 233, is sent to the basic function 251 by the application 231a, 231b to merge the calls, if other calls already exist. To listen to the "merge complete" signal, an additional signal listener 232a, 232b is activated by the application 231a, 231b. After all calls are merged, the multi party call is established.

A slightly different example using the above described mechanism is the establishment of a connection to a subscriber using several available call numbers (e.g. home, work, etc. . . . ). One call number is called directly wherein the other call numbers are sent in the initialization message. The handling of these call numbers is the same as in the multi party call, example. The only difference is that the process is stopped if one connection is made.

Another example for using the inventive method is the establishment of an advanced call without considering the setting in the home location register (HLR). Normally the setup in the HLR can not be changed so easily. One of the settings is e.g. the allowance to display the own call number on the display of the called party. By selecting an application 11 on the UE 1, the application 11 triggers the UE 1 to send an initialization message via the application interface 21 to the MSC server 2. The IMSI of the UE 1 is determined and a call listener 22 is activated. In parallel a call timer is started. A signal listener 232a, 232b is created to listen to the HLR checking signal in the basic function 251. If the signal is detected, the method call in the MSC is blocked. The information element in the HLR signal, which indicates an allowance for the display of the caller number to the called party, is replaced by an information element which forbids the display of the caller number. After the new information element is send to the basic function 251 via the signal adapter 233, the method call in the basic function 251 proceeds, triggered by a further signal via the signal adapter 233. It is also possible to display the HLR settings to the UE 1 by sending the data through the application interface 21 to an application 11 of the UE 1. The user can select the setup-information he wants to use for this call and sends the information back to the application 231a, 231b of the programming module 23. The application 231a, 231b then replaces during the call setup the current HLR information elements related to the current call reference number with the changed HLR information element in the basic function 251 by translating the signals in the signal adapter 233.

Another example for using the inventive method is the integration of a calendar of the called party on the terminating side. After the handling of the initialization message and after a call is made and detected by the incoming call listener 22, a timer is started in an application 234, 231a, 231b located in the programming module 23. If a signal listener 232a, 232b, which was established before, does not detect a "connection established" signal in the basic function 251 before this timer expires, the calendar of the called party is contacted. If the result is an entry of an appointment in the calendar of the called party which currently takes place, a message can be transferred to the UE 1 of the caller that the called party is busy (e.g. by sending an SMS). An automatic call back function can be set in the UE 1 which triggers the UE 1 to build up a call e.g. 5 minutes after the appointment ends. It is also possible that the application 234, 231a, 231b triggers a call to both party members after the end of the appointment of the called party.

After a terminating UE 1 set an indication to the terminating MSC server 2 that it is interested to handle the incoming call specially, an incoming call listener 22 listening on the B-number of an incoming call is activated at the terminating MSC server 2. After the incoming call listener 22 at the terminating MSC server 2 receives a call 13 with a specific call reference number or B-number, signal listeners 232a, 232b are set. One signal listener 232a, 232b is set to listen for call forwarding cases. If the call forwarding case is detected, the signal is not blocked (method execution ongoing) and an application 231a is activated which checks the actual outlook status. If the subscriber of the terminating UE 1 is in a meeting, this information can e.g. send in an SMS to the called party (triggered by 231a and 233).

Figure 4:
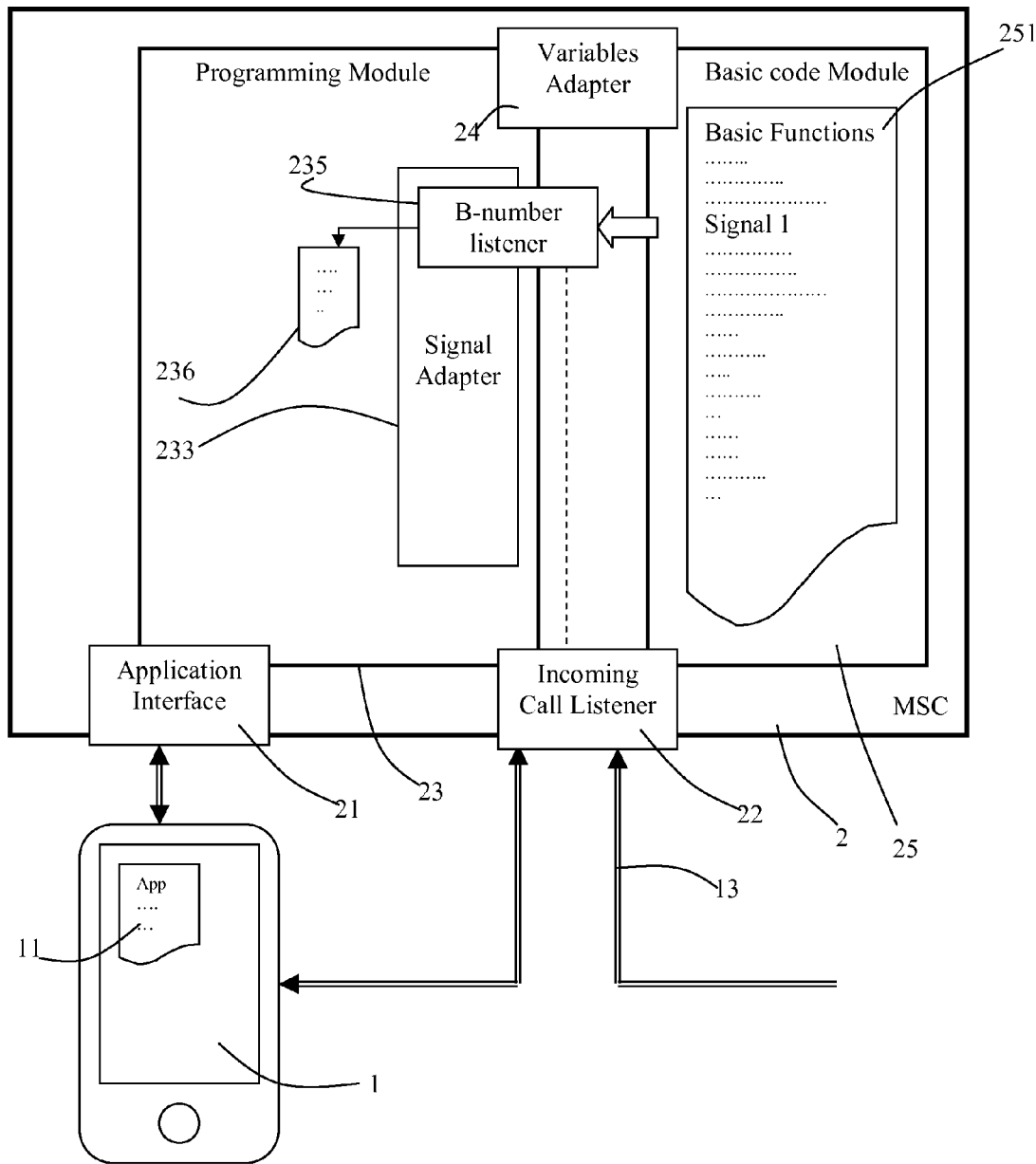
FIG. 4 shows a block diagram of a terminating serving node according to one embodiment of the invention.

To reduce the traffic in the net, a further embodiment of the present invention is introduced which prevents the participation of the terminating UE 1 in the call setup procedure. Therefore, a B-number listener 235 is established in the MSC server 2, which detects incoming calls 13 in the basic code module 25, including specified identification signatures. If the B-number listener 235 detects specified signals in the basic function 251, it triggers an application 236 inside the programming module 25 which performs e.g. a call forwarding as described above. FIG. 4 depicts such a B-number listener 235 which is always active. The B-number listener 235 can be located inside the incoming call listener 22 (pictured by a dashed line). It checks the B-number instead of the IMSI. The B-number listener 231 does not comprise a timer which terminates the listening process like the incoming call listener 22.

Figure 5:
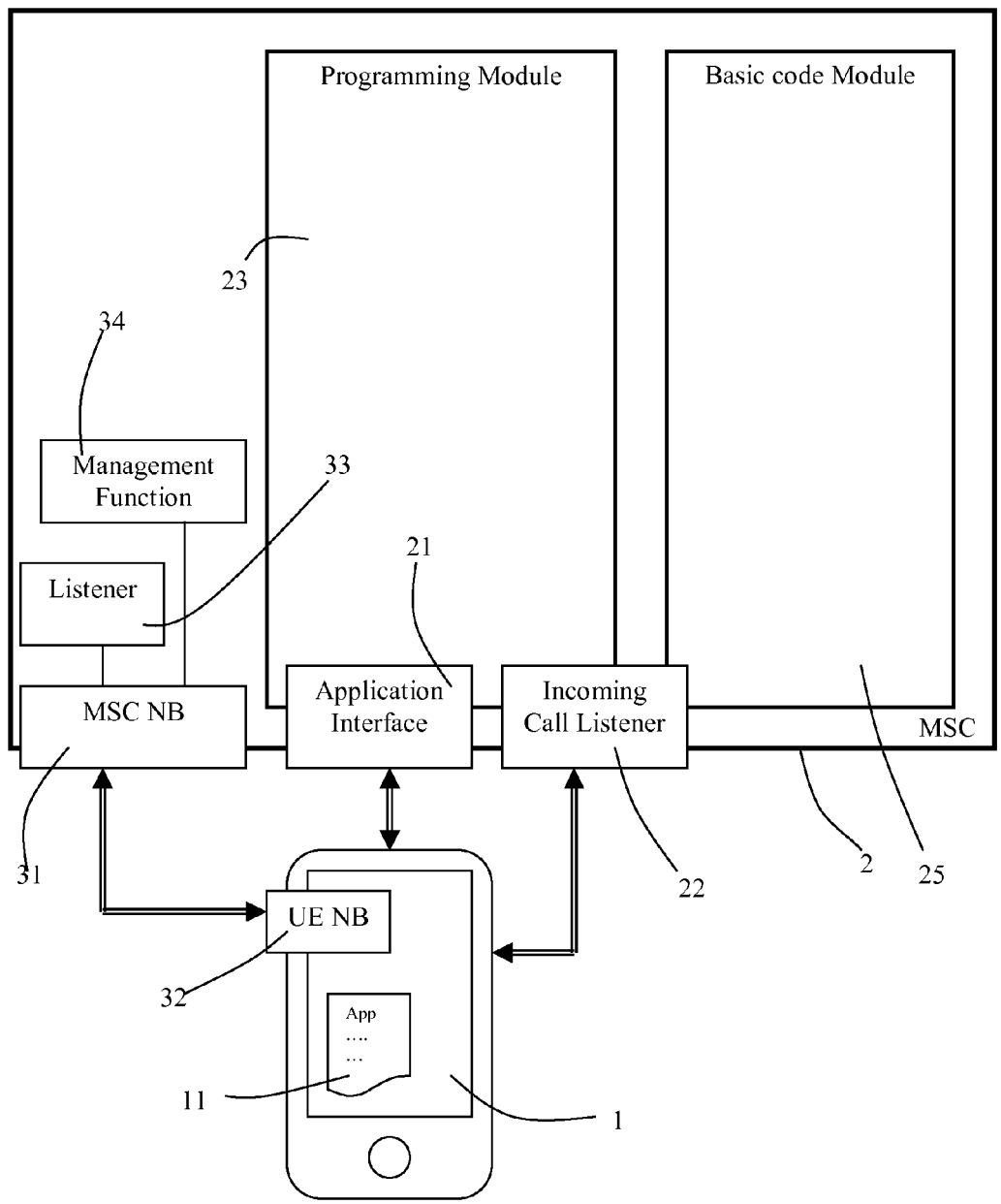
FIG. 5 shows a block diagram of an embodiment of a serving node and a mobile terminal for the authentication procedure.

FIG. 5 depicts additional negotiation interfaces 31, 32 for the communication between an MSC server 2 and a UE 1. Because network configuration can be quite different, it may happen that the necessary implementation is not available in the MSC server 2. Some operators have e.g. activated Automatic Cross-Connection Equipment (AXE) features, others not. If a user of a UE 1 tries to use additional functions which require the prescribed features/environments in the MSC server 2, the UE 1 has to check if the features/environments are available in the MSC server 2. The possibilities of an MSC server 2 can be based on the hardware, on the software version, on the performance or on specific features. Therefore, a negotiation procedure has to be performed.

Before an initialization message is sent by the UE 1 to the application interface 21, a request is sent to a MSC negotiation box 31 (MSCNB) by a negotiation box 32 of the UE 1 (UENB), checking if an according application is implemented in the programming module 23 of the MSC server 2. The MSCNB 31 checks the received individual code or service identifier of the UENB 32 which is associated with the application 11 of the UE 1. A result is sent back to the UENB 32 which indicates the general availability of the application or service in the MSC server 2.

One result can be that the MSC server 2 is not able to handle the application 11 in the UE 1 because the MSC server 2 has no compliant in the programming module 23. An announcement can be created on the UE 1 that this application cannot be performed in this environment at all. Another option can be that a reduced application is triggered instead. If this application is available in the programming module 23 the other requirements (hardware, performance, etc. . . . ) are checked. Therefore the UENB 32 sends a request including the for the application relevant checking parameters to the MSCNB 31.

Another result of a negotiation can be that the performance is not good enough to provide the requested features. One performance parameter is e.g. the transfer speed or the connection speed. Due to an overload condition in the MSC server 2 or in the network, the connection speed can be very low. An announcement can be created on the UE 1 that currently the application cannot be performed due to performance problems.

In another embodiment, the UENB 32 sends several parameter-requests to the MSCNB 31 which is needed for executing an application 11 properly. These parameter-requests can include the type of hardware, the relevant features (applications) and the performance of specified connection channels the MSC server 2 is supported. After receiving an answer, the UE 1 can determine if a special application 11 can be executed.

In another embodiment, listener 33 can be created by the UE 1 to listen at specific parameters in the MSC server 2. A parameter can e.g. be any kind, of connection speed, which is important to execute an application 11 in the UE 1. If the connection speed is too low, a listener 33 is created which listens at the connection speed. If the connection speed increases above a certain level, the listener informs the UENB 32, that the connection speed does not hamper the execution of the application 11 any more. Another parameter can e.g. be the number of multi party instances in the MSC server 2.

In another embodiment of the invention, a management function 34 is located inside the MSC server 2 which is adapted to check the amount of active or hanging calls at this specific MSC server 2. If a specific amount of calls are handled by this MSC server 2, the management function 34 prevents the execution of any activity inside the programming module 23 for a specific application. This kind of resource management prevents that basic calls and e.g. emergency calls cannot be handled by the MSC server 2 because several applications are running in the programming module 23 which reduce the performance of the MSC server 2. The management function 34 can also give free resources needed for applications running in the programming module 23 if resources are available.

The invention claimed is:

1. A method of supporting a communication established between a mobile terminal (UE), and a serving node of a telecommunication network, the serving node comprising an application interface for receiving and sending messages to the UE, a programming module adapted to store and process applications, and a basic code module adapted to store and process basic functions of the serving node, wherein the serving node performs the following method steps:
   receiving an initialization message from the UE at the application interface and determining a call reference number for the succeeding incoming call,
   activating an incoming call listener to listen for incoming calls, related to the call reference number,
   creating a signal listener, which listens for a trigger-signal in the basic functions,
   after the incoming call listener detects an incoming call related to the call reference number, allocating the signal listener to the incoming call,
   executing an application in the programming module after the signal listener detects a trigger-signal in the basic functions related to the call reference number, and
   determining whether to block execution of a basic function in the serving node related to the call reference number during execution of the application in the programming module.

2. The method according to claim 1, wherein after the application interface receives an initialization message from the UE, an application, triggered by the application interface, is executed to create a signal listener and to trigger basic functions in the basic code module.

3. The method according to claim 1, wherein the call reference number is an international mobile subscriber identity, IMSI.

4. The method according to claim 1, wherein after the activation of the incoming call listener, the serving node further performs the following steps:
   starting a call timer associated with the call reference number,
   deactivating the incoming call listener which is related to the specified call reference number, when the call timer expires before the incoming call listener detects an incoming call related to the specified call reference number.

5. The method according to claim 1, wherein the application interface sends or receives data to or from the UE initiated by the application running in the programming module or in the UE.

6. The method according to claim 1, wherein the initialization message comprises a delay indication for the serving node to delay the deactivation of an incoming call listener.

7. The method according to claim 1, wherein a signal adapter translates data sent between the application of the programming module and the basic function of the basic code module.

8. The method according to claim 1, wherein every incoming call from another serving node is checked by a B-number listener in the terminating serving node which triggers an application inside the programming module.

9. The method according to claim 1, wherein before an initialization message is received by the serving node, a negotiation between the UE and the serving node is performed to check the ability of the serving node to handle the application of the UE.

10. The method according to claim 9, wherein the negotiation comprises the steps of:
sending a request to the serving node by the UE, wherein the request comprises a service-identity,
checking if an according application is implemented in the free programming module of the serving node, and
sending a result to the UE by the serving node indicating the availability of the application in the serving node.

11. The method according to claim 1, wherein determining whether to block execution of the basic function in the serving node related to the call reference number depends on data from the initialization message.

12. A serving node, comprising:
a basic code module, adapted to store and process basic functions of the serving node;
an application interface adapted to
receive an initialization message from a mobile terminal and determine a call reference number from the initialization message,
initiate activation of a call listener, the call listener adapted to listen for incoming calls related to the specified call reference number, after the application interface receives the initialization message from the mobile terminal, and
initiate creation of a signal listener, adapted to listen for a trigger-signal related to the specified call reference number in the basic functions of the serving node; and
a programming module, adapted to store an application and execute the application after the signal listener detects a trigger-signal in the basic functions related to the specified call reference number,
wherein the application interface is further adapted to determine whether to block execution of a basic function in the serving node related to the call reference number during execution of the application in the programming module.

13. The serving node, according to claim 12, wherein after the application interface receives an initialization message from the UE an application, triggered by the application interface, is executed to create a signal listener and to trigger basic functions in the basic code module.

14. The serving node according to claim 12, wherein the call reference number is an international mobile subscriber identity (IMSI).

15. The serving node according to claim 12, wherein after the activation of the incoming call listener, the serving node further performs the following steps:
starting a call timer associated with the call reference number,
deactivating the incoming call listener which is related to the specified call reference number, when the call timer expires before the incoming call listener detects an incoming call related to the specified call reference number.

16. The serving node according to claim 12, wherein the application interface sends or receives data to or from the UE initiated by the application running in the programming module or in the UE.

17. The serving node according to claim 12, wherein the initialization message comprises a delay indication for the serving node to delay the deactivation of an incoming call listener.

18. The serving node according to claim 12, wherein a signal adapter translates data sent between the application of the programming module and the basic function of the basic code module.

19. The serving node according to claim 12, wherein every incoming call from another serving node is checked by a B-number listener in the terminating serving node which triggers an application inside the programming module, 20. The serving node according to claim 12, wherein before an initialization message is received by the serving node, a negotiation between the UE and the serving node is performed to check the ability of the serving node to handle the application of the UE.

21. A mobile switching center (MSC), comprising:
a basic code module, adapted to store and process basic functions of the MSC;
an application interface adapted to
receive an initialization message from a mobile terminal and determine a call reference number from the initialization message,
initiate activation of a call listener, the call listener adapted to listen for incoming calls related to the specified call reference number, after the application interface receives the initialization message from the mobile terminal, and
initiate creation of a signal listener, adapted to listen for a trigger-signal related to the specified call reference number in the basic functions of the MSC; and
a programming module, adapted to store a software patch application and execute the software patch application after the signal listener detects a trigger-signal in the basic functions related to the specified call reference number; and
a signal adapter between the programming module and the basic code module,
wherein the software patch application of the programming module is programmed in a first programming language and the basic functions of the basic code module are programmed in a second programming language, and
wherein the signal adapter is adapted to translate data sent between the software patch application of the programming module and the basic functions of the basic code module, the translation of data including translation of signals from the first programming language to the second programming language.

22. The MSC, according to claim 21, further comprising:
a variables adapter connected to the basic code module, wherein the programming module is further adapted to determine the content of variables related to the specified call reference number from the variables adapter.

* * * * *

UNITED STATES PATENT AND TRADEMARK OFFICE
CERTIFICATE OF CORRECTION

PATENT NO.      : 8,787,894 B2
APPLICATION NO. : 13/182874
DATED           : July 22, 2014
INVENTOR(S)     : Brandes It is certified that error appears in the above-identified patent and that said Letters Patent is hereby corrected as shown below:

On the Title Page, in Item (57), under "ABSTRACT", in Column 2, Line 2, delete "UE and" and insert -- UE, and --, therefor.

On the Title Page, in Item (57), under "ABSTRACT", in Column 2, Line 3, delete "interface, a" and insert -- interface a --, therefor.

On the Title Page, in Item (57), under "ABSTRACT", in Column 2, Lines 4-5, delete "code module storing and processing basic functions." and insert -- code module. --, therefor.

In the Specification

In Column 1, Line 5, delete "101694958" and insert -- 10169495.8 --, therefor.

In Column 2, Line 31, delete "reference number;" and insert -- reference number, --, therefor.

In Column 2, Line 58, delete "which is:" and insert -- which is --, therefor.

In Column 4, Line 31, delete "Medium." and insert -- medium. --, therefor.

In Column 5, Line 35, delete "Which" and insert -- which --, therefor.

In Column 5, Line 38, delete "exchange," and insert -- exchange --, therefor.

In Column 5, Line 49, delete "event-driven," and insert -- event-driven --, therefor.

In Column 6, Line 9, delete "listeners 231a, 231b," and insert -- listeners 232a, 232b, --, therefor.

In Column 6, Line 19, delete "car" and insert -- call --, therefor.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,787,894 B2

In Column 6, Line 20, delete "has to" and insert -- has to be --, therefor.

In Column 6, Line 63, delete "231a;" and insert -- 231a, --, therefor.

In Column 8, Line 49, delete "234:" and insert -- 234 --, therefor.

In Column 9, Lines 59-60, delete "party call," and insert -- party call --, therefor.

In Column 10, Line 65, delete "module 25" and insert -- module 23 --, therefor.

In Column 11, Line 55, delete "listener" and insert -- a listener --, therefor.

In Column 11, Line 57, delete "kind, of" and insert -- kind of --, therefor.

In the Claims

In Column 14, Line 17, in Claim 19, delete "module," and insert -- module. --, therefor.